(12) United States Patent
Freund

(10) Patent No.: US 8,763,394 B2
(45) Date of Patent: Jul. 1, 2014

(54) SYSTEM AND METHOD FOR OPERATING A TURBOCHARGED SYSTEM

(75) Inventor: Sebastian Walter Freund, Unterföhring (DE)

(73) Assignee: General Electric Company, Niskayuna, NY (US)

(*) Notice: Subject to any disclaimer, the term of this patent is extended or adjusted under 35 U.S.C. 154(b) by 849 days.

(21) Appl. No.: 12/911,176

(22) Filed: Oct. 25, 2010

(65) Prior Publication Data
US 2012/0096927 A1 Apr. 26, 2012

(51) Int. Cl.
*F02B 33/44* (2006.01)

(52) U.S. Cl.
USPC ............ 60/605.2; 123/568.12; 123/568.16; 165/95

(58) Field of Classification Search
USPC ........... 60/605.2; 123/568.12, 568.16; 165/95
See application file for complete search history.

(56) References Cited

U.S. PATENT DOCUMENTS

| | | | |
|---|---|---|---|
| 6,826,903 B2 | 12/2004 | Yahata et al. | |
| 6,904,898 B1 | 6/2005 | Sahlén | |
| 7,281,529 B2 | 10/2007 | Lew et al. | |
| 7,406,959 B2 | 8/2008 | Kondo et al. | |
| 7,461,641 B1 | 12/2008 | Styles et al. | |
| 7,740,007 B2 | 6/2010 | Grandas | |
| 7,770,563 B2 | 8/2010 | Hamadani et al. | |
| 8,056,544 B2 * | 11/2011 | Webb et al. | 123/568.12 |
| 2010/0058748 A1 | 3/2010 | Styles et al. | |
| 2010/0107631 A1 | 5/2010 | Pearson | |
| 2010/0186783 A1 | 7/2010 | Knafl et al. | |

* cited by examiner

*Primary Examiner* — Ching Chang
(74) *Attorney, Agent, or Firm* — Joseph J. Christian

(57) ABSTRACT

A method includes detecting a presence of a fouling layer in an exhaust gas recirculation cooler of an internal combustion engine. The flow of a coolant through the exhaust gas recirculation cooler is stopped for a predetermined period of time while the engine exhaust gas flows through the exhaust gas recirculation cooler. The flow of an engine exhaust gas exiting from the exhaust gas recirculation cooler is diverted to at least one of a turbine of a turbocharger, and an exhaust pipe of the internal combustion engine. The fouling layer from the exhaust gas recirculation cooler is expelled along with the engine exhaust gas exiting the exhaust gas recirculation cooler.

16 Claims, 3 Drawing Sheets

SYSTEM AND METHOD FOR OPERATING A TURBOCHARGED SYSTEM

BACKGROUND

Figure 1:
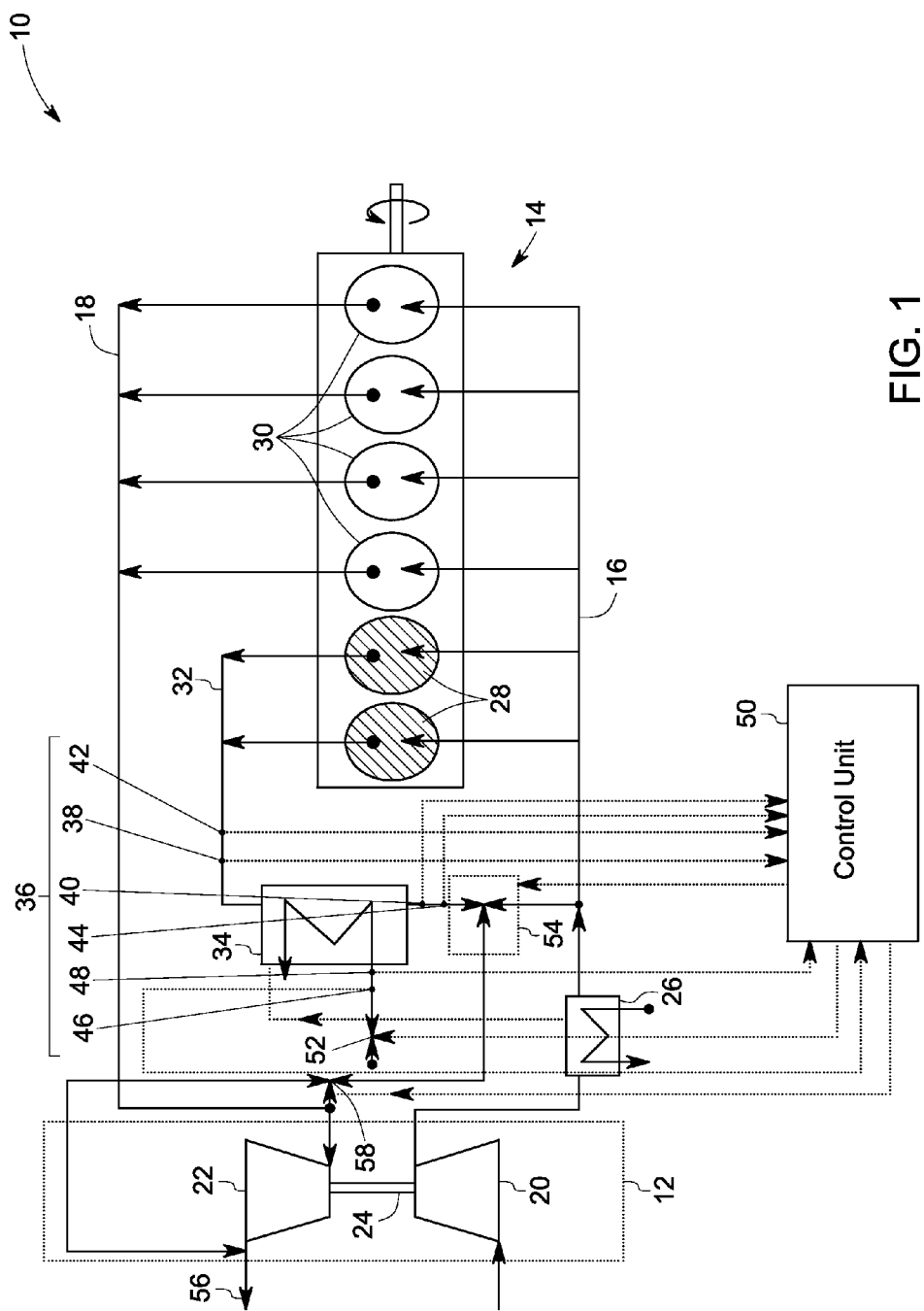

Internal combustion engines with exhaust gas recirculation (EGR), especially compression ignition engines, typically employ EGR coolers. EGR coolers are heat exchangers that typically use engine coolant to cool exhaust gas being recirculated into an intake system of the engine. Engine exhaust gas typically includes combustion by-products, such as unburned fuel, many types of hydrocarbon compounds, sulfur compounds, water, and so forth.

One of the drawbacks associated with the exhaust gas recirculation is fouling of the EGR cooler over a period of time of operation. The fouling layer typically includes carbon particles from incomplete combustion as well as unburned hydrocarbons, sulfuric acid compounds, and minerals such as oil ash. These substances agglomerate on the cooled surfaces of the EGR cooler driven by thermophoresis, condensation, and other mechanisms. The substances adhere to the surfaces of the EGR cooler by adhesive and cohesive forces, Van der Waals forces, and condensation. Fouling of the EGR cooler poses a significant challenge as the fouling layer increases the pressure loss in the heat exchanger and reduces the heat transfer rate, both of which adversely affect the engine efficiency, performance, and emissions.

Conventionally, anti-fouling features are incorporated in the EGR cooler, and the size of EGR cooler is increased to mitigate drawbacks associated with the fouling of the EGR cooler. However, such a conventional EGR cooler would need larger and more expensive area and volume and may also result in even faster formation of the fouling layer in the EGR.

For these and other reasons, there is a need for embodiments of the invention.

BRIEF DESCRIPTION

In accordance with one embodiment of the present technique, a method includes detecting a presence of a fouling layer in an exhaust gas recirculation cooler of an internal combustion engine. The flow of a coolant through the exhaust gas recirculation cooler is stopped for a predetermined period of time while the engine exhaust gas flows through the exhaust gas recirculation cooler. The flow of an engine exhaust gas exiting from the exhaust gas recirculation cooler is diverted to at least one of a turbine of a turbocharger, and an exhaust pipe of the internal combustion engine. The fouling layer from the exhaust gas recirculation cooler is expelled along with the engine exhaust gas exiting the exhaust gas recirculation cooler.

In accordance with another embodiment of the present technique, a turbocharged system having an internal combustion engine employing an exhaust gas recirculation is disclosed. The turbocharged system includes an exhaust gas recirculation cooler configured to circulate a coolant in heat exchange relationship with an engine exhaust gas fed from an exhaust gas recirculation manifold of the internal combustion engine to cool the engine exhaust gas. The turbocharged system further includes a detection system for detecting presence of a fouling layer in the exhaust gas recirculation cooler. A control unit is coupled to the exhaust recirculation cooler and the detection system and configured to stop flow of the coolant through the exhaust gas recirculation cooler for a predetermined period of time while the engine exhaust gas flows through the exhaust gas recirculation when the fouling layer is detected.

DRAWINGS

Figure 2:
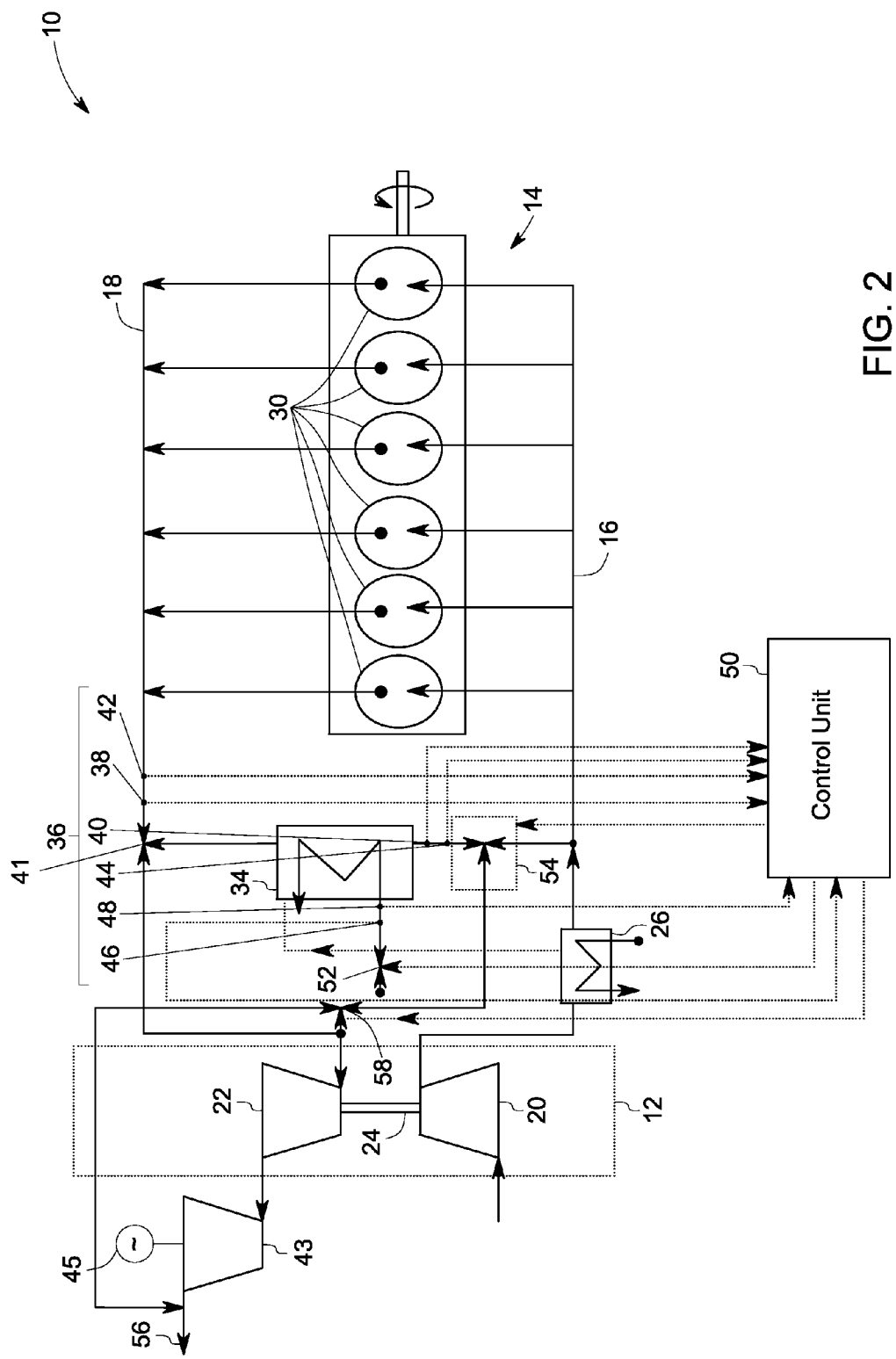
Figure 3:
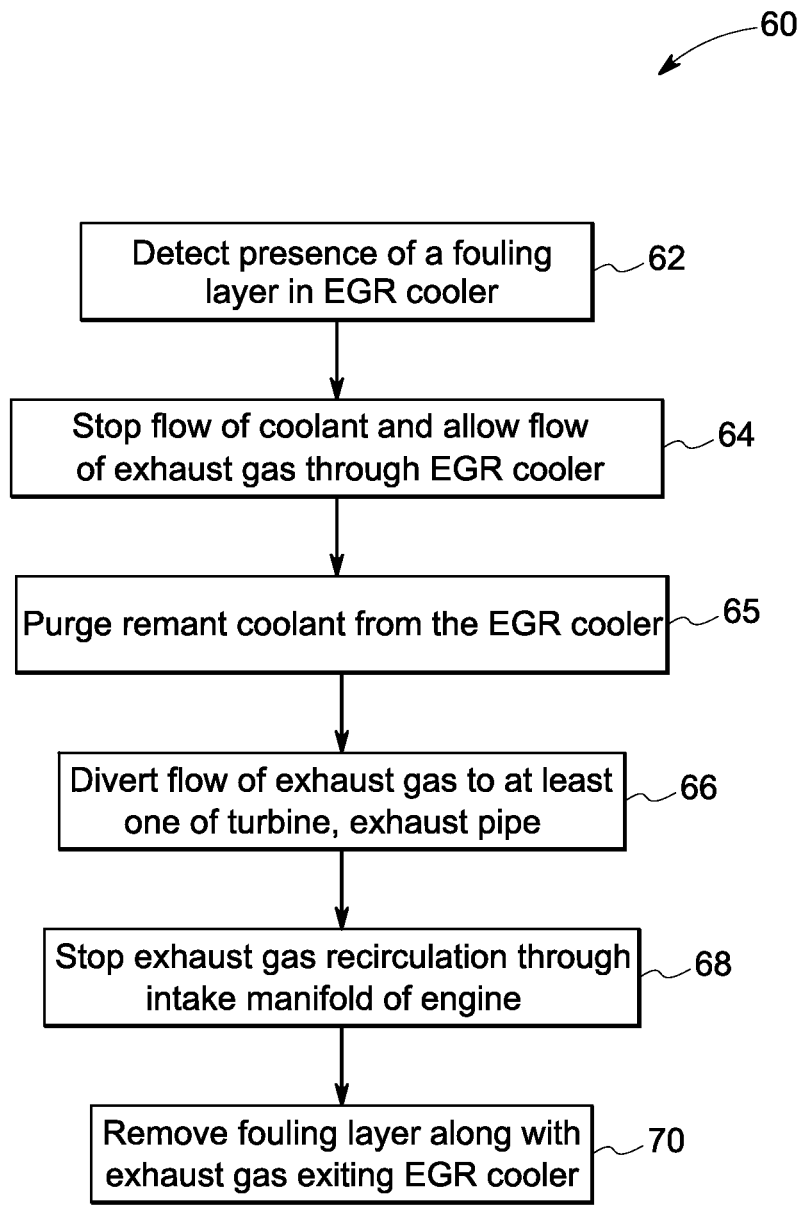

These and other features and aspects of embodiments of the present invention will become better understood when the following detailed description is read with reference to the accompanying drawings in which like characters represent like parts throughout the drawings, wherein:

FIG. 1 is a diagrammatical representation of a turbocharged system having an internal combustion engine employing an exhaust gas recirculation in accordance with an exemplary embodiment of the present technique;

FIG. 2 is a diagrammatical representation of a turbocharged system having an internal combustion engine employing an exhaust gas recirculation in accordance with an exemplary embodiment of the present technique; and FIG. 3 is a flow chart illustrating exemplary steps involved in a method of operating a turbocharged system having an internal combustion engine employing an exhaust gas recirculation in accordance with an exemplary embodiment of the present technique.

DETAILED DESCRIPTION

In accordance with the embodiments discussed herein, a system and method of operating a turbocharged system having an internal combustion engine, for example, a turbocharged engine employing an exhaust gas recirculation is disclosed. The exemplary technique includes determining or detecting the presence of a fouling layer in an exhaust gas recirculation (EGR) cooler. The flow of a coolant through the exhaust gas recirculation cooler is stopped for a predetermined time period while an engine exhaust gas flows through the exhaust gas recirculation cooler so as to substantially increase a temperature of the exhaust gas recirculation cooler. The flow of the engine exhaust gas exiting from the exhaust gas recirculation cooler is diverted to a turbine of a turbocharger and/or an exhaust pipe of the engine. The fouling layer is removed from the exhaust gas recirculation cooler along with the engine exhaust gas exiting the exhaust gas recirculation cooler. The exemplary technique described herein facilitates cleaning of an EGR cooler by increasing a temperature of the EGR cooler periodically for a short time by stopping the coolant flow through the EGR cooler. Sufficiently high surface temperature of the cooler, augmented by high gas velocity through the EGR cooler, lead to oxidation, cracking and flaking of the fouling layer.

Referring to FIG. 1, a turbocharged system 10 is illustrated in accordance with certain embodiments of the present technique. The turbocharged system 10 includes a turbo-charger 12 and an internal combustion engine 14. In one embodiment, the internal combustion engine 14 is a large diesel engine. A motor-generator unit (not shown) may be mechanically coupled to the turbocharger 12.

The illustrated engine 14 includes an air intake manifold 16 and an exhaust manifold 18. The turbo-charger 12 includes a compressor 20 and a turbine 22 and is operated to supply compressed air to the intake manifold 16 for combustion within the engine 14. The turbine 22 is coupled to the exhaust manifold 18 for extracting energy from exhaust gases for rotating a turbocharger shaft 24 coupled to the compressor 20. The compressor 20 draws ambient air through a filter (not shown) and provides compressed air to a heat exchanger 26. The temperature of the air is increased due to compression.

The compressed air flows through the heat exchanger 26 such that the temperature of the air is reduced prior to delivery into the intake manifold 16 of the engine 14. In one embodiment, the heat exchanger 26 is an air-to-water heat exchanger, which utilizes a coolant to facilitate removal of heat from the compressed air. In another embodiment, the heat exchanger is an air-to-air heat exchanger, which utilize ambient air to facilitate removal of heat from compressed air.

Fuel injection pumps (not shown) drive fuel injectors (not shown) for injecting fuel into cylinders 28, 30 of the engine 14. A piston (not shown) is slidably disposed in each of the cylinders 28, 30 and reciprocates between a top dead center and a bottom dead center position. It should be noted herein that although a total of six cylinders are illustrated, it should not be construed as limiting the scope of the invention. In other embodiments, the number of cylinders 28, 30 of the engine 14 may vary depending on the application.

The exemplary engine 14 employs an exhaust gas recirculation technique to reduce nitrogen oxide emissions and improve engine efficiency. Exhaust gas recirculation involves recirculating a portion of the engine's exhaust gas back to the engine cylinders. In the illustrated embodiment, the exhaust gas from the cylinders 30 are fed through the exhaust manifold 18 to the turbine 22. The exhaust gas from the cylinders 28 are fed through an EGR manifold 32 to an exhaust gas recirculation cooler 34. In the illustrated embodiment, the cylinders 28 may be referred to as "EGR spender cylinders". A coolant is circulated in heat exchange relationship with the exhaust gas fed from the cylinders 28 to cool the exhaust gas. The exhaust gas is nominally fed back to the cylinders 28, 30 via the intake manifold 16.

As discussed previously, one of the drawbacks associated with the exhaust gas recirculation is fouling of the EGR cooler 34 over a period of time of operation. The fouling layer typically includes carbon particles from incomplete combustion as well as unburned hydrocarbons, sulfuric acid compounds, and minerals such as oil ash. Fouling of the EGR cooler 34 poses a significant challenge as the fouling layer increases the pressure loss and reduces the heat transfer rate, both of which adversely affect the engine efficiency, performance, and emissions. As discussed in further detail below, an exemplary embodiment of the present technique provides monitoring and control features, such as sensors and control logic, to facilitate removal of the fouling layer from the EGR cooler 34 when an existence of a fouling layer is detected in the EGR cooler 34.

In the illustrated embodiment, a detection system 36 is provided for sensing various parameters associated with detection of a fouling layer in the EGR cooler 34. The detection system 36 includes first sensor 38 for sensing an inlet pressure of the engine exhaust gas entering the EGR cooler 34, a second sensor 40 for sensing exit pressure of the engine exhaust gas exiting the EGR cooler 34, a third sensor 42 for sensing an inlet temperature of the engine exhaust gas entering the EGR cooler 34, a fourth sensor 44 for sensing an exit temperature of the engine exhaust gas exiting the EGR cooler 34, a fifth sensor 46 for sensing an inlet pressure of the coolant entering the EGR cooler 34, a sixth sensor 48 for sensing an exit pressure of the coolant exiting the EGR cooler 34. It should be noted herein that the configuration of the detection system 36 is an exemplary embodiment and should not be construed as limiting the scope of the invention.

In the illustrated embodiment, the system 10 also includes a control unit 50. The illustrated control unit 50 is an electronic thermal regeneration control unit for the EGR cooler 34. In another embodiment, the control unit 50 is an electronic logic controller that is programmable by a user. The control unit 50 is communicatively coupled to the sensors 38, 40, 42, 44, 46, 48. In one embodiment, the control unit 50 is configured to determine the presence of a fouling layer in the EGR cooler 34 based on an output of each sensor among the sensors 38, 40, 42, 44, 46, and 48. In a more specific embodiment, the control unit 50 is configured to determine the presence of a fouling layer in the EGR cooler 34 by comparing each parameter among the plurality of parameters (output of each sensor) with a corresponding predetermined threshold value.

Referring again to the EGR cooler 34, one control device 52, for example a control valve, is provided for controlling flow of coolant through the EGR cooler 34. Further, another control device 54, for example a three-way valve, is provided for controlling flow of the exhaust gas exiting from the EGR cooler 34. Nominally, the exhaust gas is fed to the intake manifold 16 of the engine 14. In an alternate embodiment, the exhaust gas is fed to the turbine 22. In yet another embodiment, the exhaust gas is fed to an exhaust pipe 56 via another control device 58.

In certain embodiments, the control unit 50 is configured to automatically control the control device 52, and the other control devices 54, 58 based on outputs from the sensors 38, 40, 42, 44, 46, 48. When the presence of a fouling layer in the EGR cooler 34 is detected, the control unit 50 controls the control device 52 to stop the flow of the coolant through the EGR cooler 34 for a predetermined period of time while the engine exhaust gas flows through the EGR cooler 34. Specifically, the flow of the coolant through the EGR cooler 34 is stopped or interrupted for a predetermined period of time and the remnant coolant is removed from the EGR cooler 34 while the exhaust gas flows through the EGR cooler 34. In one embodiment, the remnant coolant is removed from the EGR cooler 34 using compressed air from the compressor 20. In certain embodiments, the remnant coolant is removed from the EGR cooler 34 using compressed air from an external compressor 20. In another embodiment, the remnant coolant is drained from the EGR cooler 34 by gravity. The removal of the remnant fluid from the EGR cooler 34 facilitates to heat the EGR cooler 34 to the predetermined temperature in a shorter duration without evaporating the coolant. As a result, the temperature of the EGR cooler 34 is substantially increased. The flow of the exhaust gas to the intake manifold 16 is stopped for the predetermined time period. Concurrently, the control unit 50 controls the other control devices 54, 58 to divert the flow of the exhaust gas exiting from the EGR cooler 34 to at least one of the turbine 22 and the exhaust pipe 56. This results in substantial increase in the flow velocity of the exhaust gas through the EGR cooler 34. The high surface temperature of the EGR cooler 34, augmented by the high gas velocity of the exhaust gas through the EGR cooler 34, lead to oxidation, cracking and flaking of the fouling layer. In another embodiment, the control device 52, and the other control devices 54, 58 are controlled manually. In yet another specific embodiment, the control unit 50 is a model-based control unit.

Referring to FIG. 2, a turbocharged system 10 is illustrated in accordance with certain embodiments of the present technique. In the illustrated embodiment, the engine 14 does not have separate EGR spender cylinders. Instead, the engine 14 has six cylinders 30. In one embodiment, an exhaust gas recirculation valve 41 controls flow of the exhaust gas fed through the exhaust manifold 18 to at least one of the turbine 22, or the exhaust pipe. In another embodiment, the exhaust gas recirculation valve 41 controls flow of the exhaust gas fed through the exhaust manifold 18 to the exhaust gas recirculation cooler 34. In the illustrated embodiment, the control unit 50 is additionally configured to automatically control the exhaust gas recirculation valve 41 based on outputs from the sensors 38, 40, 42, 44, 46, 48.

In certain embodiments, the other control device 58 is also configured to throttle the flow of the exhaust gas to the turbine 22 to increase the backpressure of the engine 14 sufficiently to divert a large fraction of exhaust gas to flow through the EGR cooler 34 during thermal regeneration. Further, the system 10 includes a turbocompound power turbine 43 provided downstream of the turbocharger 12 to recover energy from the engine exhaust gas. The turbine 43 increases the output of the engine 14 without increasing the fuel consumption much, thus reducing the specific fuel consumption. The turbine 43 is coupled to a generator 45 configured to generate power. The turbine 43 is referred to as a "power turbine" as it recovers energy from the exhaust gas to generate extra power. In other words, in the illustrated embodiment, the turbocharged system 10 is turbo-compound system with increased exhaust backpressure.

Referring to FIG. 3, a flow chart illustrating exemplary method of operating a turbocharged system is disclosed. The method 60 includes determining or detecting the presence of a fouling layer in an EGR cooler of a turbocharged system as represented by the step 62. In one embodiment, the fouling layer is detected based on one or more parameters or values output by the sensors. The parameters include an inlet pressure of the engine exhaust gas entering the EGR cooler, an exit pressure of the engine exhaust gas exiting the EGR cooler, an inlet temperature of the engine exhaust gas entering the EGR cooler, an exit temperature of the engine exhaust gas exiting the EGR cooler, an inlet pressure of the coolant entering the EGR cooler, and an exit pressure of the coolant exiting the EGR cooler. The presence of the fouling layer is detected based on one or more of these parameters. More specifically, the presence of the fouling layer is detected by comparing one or more of the parameters with respective to predetermined threshold values.

When the presence of the fouling layer in the EGR cooler is detected, flow of a coolant through the EGR cooler is stopped for a predetermined time period and flow of an engine exhaust gas through the EGR cooler is allowed as represented by the step 64. Specifically, the flow of coolant through the EGR cooler is stopped for the predetermined time period. The remnant coolant is removed from the EGR cooler as represented by the step 65. The remnant coolant is removed from the EGR cooler using compressed air from the compressor of the turbocharger, or an external compressor, or by gravity. As a result, a temperature of the EGR cooler is increased substantially. In one embodiment, the temperature of the EGR cooler is increased to 700 Kelvin, for example. Concurrently, the flow of the exhaust gas exiting from the EGR cooler is diverted to at least one of a turbine of a turbocharger and an exhaust pipe of the engine as represented by the step 66. This diversion of the exhaust gas leads to expansion of the exhaust gas to a lower pressure. The velocity and flow rate of the exhaust gas through the EGR cooler is increased as a result of the lowered backpressure. Also, flow of the exhaust gas exiting from the EGR cooler to an intake manifold of the engine is stopped for the predetermined time period as represented by the step 68. In other words, during the cleaning of the EGR cooler, engine operation parameters are set in such a way so as to maximize temperature and gas flow rate through the EGR cooler.

The fouling layer or a reaction product thereof in the EGR cooler is removed along with the exhaust gas exiting from the EGR cooler as represented by the step 70. The increase in temperature of the EGR cooler triggered by the stopping of coolant flow through the EGR cooler results in oxidation, cracking and flaking of the deposits in the fouling layer. Also, diverting the exhaust gas from the cooler to at least one of the turbine, exhaust pipe during thermal regeneration of the cooler has the operational benefit that the operation of the engine is not compromised due to the unduly high temperatures of the uncooled EGR in the intake manifold of the engine. The additional turbine power of the turbocharger provides enough charge air to compensate for the EGR fraction not supplied to the intake manifold during cleaning of the EGR cooler. The exemplary EGR cooler do not require frequent cleaning operations and can be operated without sacrificing performance over extended periods of operation time. As a result, pressure loss in the cooler is reduced and the engine efficiency is improved.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A turbocharged system having an internal combustion engine employing an exhaust gas recirculation, the turbocharged system comprising:
   an exhaust gas recirculation cooler configured to circulate a coolant in heat exchange relationship with an engine exhaust gas fed from an exhaust manifold of the internal combustion engine to cool the engine exhaust gas;
   a detection system for detecting presence of a fouling layer in the exhaust gas recirculation cooler; and
   a control unit coupled to the exhaust recirculation cooler and the detection system and configured to stop flow of the coolant through the exhaust gas recirculation cooler for a predetermined period of time while the engine exhaust gas flows through the exhaust gas recirculation cooler when the fouling layer is detected.

2. The turbocharged system of claim 1, wherein the control unit controls flow of the engine exhaust gas exiting from the exhaust gas recirculation cooler to at least one of a turbine of a turbocharger, an exhaust pipe of the engine, and an intake manifold of the engine.

3. The system of claim 1, further comprising:
   a detection system for sensing a plurality of parameters comprising at least one of an inlet pressure of the engine exhaust gas entering the exhaust gas recirculation cooler, an exit pressure of the engine exhaust gas exiting the exhaust gas recirculation cooler, an inlet temperature of the engine exhaust gas entering the exhaust gas recirculation cooler, an exit temperature of the engine exhaust gas exiting the exhaust gas recirculation cooler, an inlet pressure of the coolant entering the exhaust gas recirculation cooler, and an exit pressure of the coolant exiting the exhaust gas recirculation cooler;
   wherein the detection system detects the presence of the fouling layer based on the parameters detected by the detection system.

4. The system of claim 3, wherein the control unit is configured to compare each parameter among the plurality of parameters detected by the detection system with a corresponding predetermined threshold value.

5. The system of claim 4, wherein the control unit is configured to detect the fouling layer in the exhaust gas recirculation cooler based on the comparison of each parameter among the plurality of parameters detected by the detection system with the corresponding predetermined threshold value.

6. The system of claim 1, wherein the control unit controls a control device to stop the flow of the coolant through the exhaust gas recirculation cooler for the predetermined period of time based on the detection of the fouling layer in the exhaust gas recirculation cooler so as to substantially increase a temperature of the exhaust gas recirculation cooler.

7. The system of claim 6, wherein the control unit controls at least one other control device to divert flow of the engine exhaust gas exiting from the exhaust gas recirculation cooler to at least one of the turbine of the turbocharger, and the exhaust pipe of the engine when flow of the coolant through the exhaust gas recirculation cooler is stopped for the predetermined period of time.

8. The system of claim 7, wherein the at least one other control device is configured to stop flow of the engine gas exiting from the exhaust gas recirculation cooler to the intake manifold of the internal combustion engine.

9. The system of claim 7, wherein the at least one other control device is configured divert flow of the engine exhaust gas exiting from the exhaust gas recirculation cooler to at least one of the turbine of the turbocharger and the exhaust pipe of the internal combustion engine when flow of the coolant through the exhaust gas recirculation cooler is stopped for the predetermined period of time while the engine exhaust gas flows through the exhaust gas recirculation cooler so as to remove the fouling layer from the exhaust gas recirculation cooler along with the engine exhaust gas exiting the exhaust gas recirculation cooler.

10. The system of claim 9, wherein the control unit is configured to automatically control the control device, and the at least one other control device based on detection of the fouling layer in the exhaust gas recirculation cooler.

11. The system of claim 7, wherein the at least one other control device comprises a three-way valve.

12. The system of claim 7, wherein the at least one other control device is further configured to throttle the flow of the engine exhaust gas to the turbine of the turbocharger to divert exhaust gas to flow through the EGR cooler.

13. The system of claim 1, wherein the control unit is a model-based control unit.

14. The system of claim 1, wherein the internal combustion engine comprises a diesel engine.

15. The system of claim 1, wherein the internal combustion engine comprises one or more exhaust gas recirculation spender cylinders; wherein the engine exhaust gas from the one or more exhaust gas recirculation spender cylinders is recirculated through the exhaust gas recirculation cooler via the exhaust gas manifold.

16. The system of claim 1, wherein the turbocharged system is a turbo-compound system comprising a turbine to generate power and increase an exhaust back pressure of the engine.

* * * * *